(12) United States Patent
Arimoto et al.

(10) Patent No.: US 7,494,293 B2
(45) Date of Patent: Feb. 24, 2009

(54) DIGITAL SINGLE-LENS REFLEX CAMERA

(75) Inventors: Akira Arimoto, Tokyo (JP); Koichi Sato, Saitama (JP)

(73) Assignee: Hoya Corporation, Tokyo (JP)

( * ) Notice: Subject to any disclaimer, the term of this patent is extended or adjusted under 35 U.S.C. 154(b) by 330 days.

(21) Appl. No.: 11/322,244

(22) Filed: Jan. 3, 2006

(65) Prior Publication Data
US 2006/0147200 A1 Jul. 6, 2006

(30) Foreign Application Priority Data
Jan. 5, 2005 (JP) .......................... P2005-000620

(51) Int. Cl.
G03B 17/00 (2006.01)
(52) U.S. Cl. ...................... 396/529; 359/819
(58) Field of Classification Search .................. 396/93, 396/529, 110; 359/819
See application file for complete search history.

(56) References Cited

U.S. PATENT DOCUMENTS

| | | | |
|---|---|---|---|
| 4,912,494 A * | 3/1990 | Tanaka et al. ................. | 396/93 |
| 2003/0048374 A1 | 3/2003 | Minakuti et al. | |
| 2004/0109083 A1 | 6/2004 | Fuchimukai | |
| 2006/0087707 A1 * | 4/2006 | Akaho ........................ | 358/518 |

FOREIGN PATENT DOCUMENTS

| JP | 2000-184247 | 6/2000 |
|---|---|---|
| JP | 2000-244930 | 9/2000 |
| JP | 2002-232899 | 8/2002 |
| JP | 2003-078794 | 3/2003 |
| JP | 2003163826 A * | 6/2003 |

OTHER PUBLICATIONS

U.S. Appl. No. 11/275,415 to Arimoto, which was filed Dec. 30, 2005.
English language abstract of JP 2000-184247.
English language abstract of JP 2003-078794.

* cited by examiner

Primary Examiner—Christopher E Mahoney
Assistant Examiner—Autumn Parker
(74) Attorney, Agent, or Firm—Greenblum & Bernstein, P.L.C.

(57) ABSTRACT

A digital single-lens reflex camera includes a lens unit and a camera body. The lens unit has a photographing lens and an identification data memory for storing identification data to identify the photographing lens. The camera body, to which the lens unit is detachably attached, has an imaging device which receives light transmitted through the photographing lens to generate an image corresponding to a subject, a lens data memory for storing lens data that indicates the shading characteristics of the photographing lens, a lens data reader that reads the lens data based on the identification data, and an image corrector that corrects an error in the image of the subject caused by shading, based on the lens data read by the lens data reader and imaging device data that indicates the shading characteristics of the imaging device.

20 Claims, 16 Drawing Sheets

| -4 | -3 | -2 | -1 | 0 | 0 | 0 | -1 | -2 | -3 | -4 |
|---|---|---|---|---|---|---|---|---|---|---|
| -3 | -2 | -1 | 0 | 0 | 0 | 0 | 0 | -1 | -2 | -3 |
| -2 | -1 | 0 | 0 | 0 | 0 | 0 | 0 | 0 | -1 | -2 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -2 | -1 | 0 | 0 | 0 | 0 | 0 | 0 | 0 | -1 | -2 |
| -3 | -2 | -1 | 0 | 0 | 0 | 0 | 0 | -1 | -2 | -3 |
| -4 | -3 | -2 | -1 | 0 | 0 | 0 | -1 | -2 | -3 | -4 | f=28mm、F=2

(B)

| -3 | -2 | -1 | 0 | 0 | 0 | 0 | 0 | -1 | -2 | -3 |
|---|---|---|---|---|---|---|---|---|---|---|
| -2 | -1 | 0 | 0 | 0 | 0 | 0 | 0 | 0 | -1 | -2 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -2 | -1 | 0 | 0 | 0 | 0 | 0 | 0 | 0 | -1 | -2 |
| -3 | -2 | -1 | 0 | 0 | 0 | 0 | 0 | -1 | -2 | -3 | f=50mm、F=2

(C)

| -2 | -1 | 0 | 0 | 0 | 0 | 0 | 0 | 0 | -1 | -2 |
|---|---|---|---|---|---|---|---|---|---|---|
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -2 | -1 | 0 | 0 | 0 | 0 | 0 | 0 | 0 | -1 | -2 | f=100mm、F=2

| -5 | -4 | -3 | -2 | -1 | 0 | -1 | -2 | -3 | -4 | -5 |
|---|---|---|---|---|---|---|---|---|---|---|
| -4 | -3 | -2 | -1 | 0 | 0 | 0 | -1 | -2 | -3 | -4 |
| -3 | -2 | -1 | 0 | 0 | 0 | 0 | 0 | -1 | -2 | -3 |
| -2 | -1 | 0 | 0 | 0 | 0 | 0 | 0 | 0 | -1 | -2 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -2 | -1 | 0 | 0 | 0 | 0 | 0 | 0 | 0 | -1 | -2 |
| -3 | -2 | -1 | 0 | 0 | 0 | 0 | 0 | -1 | -2 | -3 |
| -4 | -3 | -2 | -1 | 0 | 0 | 0 | -1 | -2 | -3 | -4 |
| -5 | -4 | -3 | -2 | -1 | 0 | -1 | -2 | -3 | -4 | -5 | f=28mm、F=5.6

(B)

| -4 | -3 | -2 | -1 | 0 | 0 | 0 | -1 | -2 | -3 | -4 |
|---|---|---|---|---|---|---|---|---|---|---|
| -3 | -2 | -1 | 0 | 0 | 0 | 0 | 0 | -1 | -2 | -3 |
| -2 | -1 | 0 | 0 | 0 | 0 | 0 | 0 | 0 | -1 | -2 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -2 | -1 | 0 | 0 | 0 | 0 | 0 | 0 | 0 | -1 | -2 |
| -3 | -2 | -1 | 0 | 0 | 0 | 0 | 0 | -1 | -2 | -3 |
| -4 | -3 | -2 | -1 | 0 | 0 | 0 | -1 | -2 | -3 | -4 | f=50mm、F=5.6

(C)

| -3 | -2 | -1 | 0 | 0 | 0 | 0 | 0 | -1 | -2 | -3 |
|---|---|---|---|---|---|---|---|---|---|---|
| -2 | -1 | 0 | 0 | 0 | 0 | 0 | 0 | 0 | -1 | -2 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -2 | -1 | 0 | 0 | 0 | 0 | 0 | 0 | 0 | -1 | -2 |
| -3 | -2 | -1 | 0 | 0 | 0 | 0 | 0 | -1 | -2 | -3 | f=100mm、F=5.6

| -6 | -5 | -4 | -3 | -2 | -2 | -2 | -3 | -4 | -5 | -6 |
|---|---|---|---|---|---|---|---|---|---|---|
| -5 | -4 | -3 | -2 | -1 | -1 | -1 | -2 | -3 | -4 | -5 |
| -4 | -3 | -2 | -1 | 0 | 0 | 0 | -1 | -2 | -3 | -4 |
| -3 | -2 | -1 | 0 | 0 | 0 | 0 | 0 | -1 | -2 | -3 |
| -2 | -1 | 0 | 0 | 0 | 0 | 0 | 0 | 0 | -1 | -2 |
| -2 | -1 | 0 | 0 | 0 | 0 | 0 | 0 | 0 | -1 | -2 |
| -2 | -1 | 0 | 0 | 0 | 0 | 0 | 0 | 0 | -1 | -2 |
| -3 | -2 | -1 | 0 | 0 | 0 | 0 | 0 | -1 | -2 | -3 |
| -4 | -3 | -2 | -1 | 0 | 0 | 0 | -1 | -2 | -3 | -4 |
| -5 | -4 | -3 | -2 | -1 | -1 | -1 | -2 | -3 | -4 | -5 |
| -6 | -5 | -4 | -3 | -2 | -2 | -2 | -3 | -4 | -5 | -6 | f=28mm、F=11

(B)

| -5 | -4 | -3 | -2 | -1 | 0 | -1 | -2 | -3 | -4 | -5 |
|---|---|---|---|---|---|---|---|---|---|---|
| -4 | -3 | -2 | -1 | 0 | 0 | 0 | -1 | -2 | -3 | -4 |
| -3 | -2 | -1 | 0 | 0 | 0 | 0 | 0 | -1 | -2 | -3 |
| -2 | -1 | 0 | 0 | 0 | 0 | 0 | 0 | 0 | -1 | -2 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -2 | -1 | 0 | 0 | 0 | 0 | 0 | 0 | 0 | -1 | -2 |
| -3 | -2 | -1 | 0 | 0 | 0 | 0 | 0 | -1 | -2 | -3 |
| -4 | -3 | -2 | -1 | 0 | 0 | 0 | -1 | -2 | -3 | -4 |
| -5 | -4 | -3 | -2 | -1 | 0 | -1 | -2 | -3 | -4 | -5 | f=50mm、F=11

(C)

| -4 | -3 | -2 | -1 | 0 | 0 | 0 | -1 | -2 | -3 | -4 |
|---|---|---|---|---|---|---|---|---|---|---|
| -3 | -2 | -1 | 0 | 0 | 0 | 0 | 0 | -1 | -2 | -3 |
| -2 | -1 | 0 | 0 | 0 | 0 | 0 | 0 | 0 | -1 | -2 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -2 | -1 | 0 | 0 | 0 | 0 | 0 | 0 | 0 | -1 | -2 |
| -3 | -2 | -1 | 0 | 0 | 0 | 0 | 0 | -1 | -2 | -3 |
| -4 | -3 | -2 | -1 | 0 | 0 | 0 | -1 | -2 | -3 | -4 | f=100mm、F=11

| -2 | -2 | -1 | -1 | 0 | 0 | 0 | -1 | -1 | -2 | -2 |
|---|---|---|---|---|---|---|---|---|---|---|
| -2 | -1 | -1 | 0 | 0 | 0 | 0 | 0 | -1 | -1 | -2 |
| -1 | -1 | 0 | 0 | 0 | 0 | 0 | 0 | 0 | -1 | -1 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -1 | -1 | 0 | 0 | 0 | 0 | 0 | 0 | 0 | -1 | -1 |
| -2 | -1 | -1 | 0 | 0 | 0 | 0 | 0 | -1 | -1 | -2 |
| -2 | -2 | -1 | -1 | 0 | 0 | 0 | -1 | -1 | -2 | -2 | f=28mm、F=2

(B)

| -2 | -1 | -1 | 0 | 0 | 0 | 0 | 0 | -1 | -1 | -2 |
|---|---|---|---|---|---|---|---|---|---|---|
| -1 | -1 | 0 | 0 | 0 | 0 | 0 | 0 | 0 | -1 | -1 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -1 | -1 | 0 | 0 | 0 | 0 | 0 | 0 | 0 | -1 | -1 |
| -2 | -1 | -1 | 0 | 0 | 0 | 0 | 0 | -1 | -1 | -2 | f=50mm、F=2

(C)

| -1 | -1 | 0 | 0 | 0 | 0 | 0 | 0 | 0 | -1 | -1 |
|---|---|---|---|---|---|---|---|---|---|---|
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -1 | -1 | 0 | 0 | 0 | 0 | 0 | 0 | 0 | -1 | -1 | f=100mm、F=2

| -3 | -2 | -2 | -1 | -1 | 0 | -1 | -1 | -2 | -2 | -3 |
|---|---|---|---|---|---|---|---|---|---|---|
| -2 | -2 | -1 | -1 | 0 | 0 | 0 | -1 | -1 | -2 | -2 |
| -2 | -1 | -1 | 0 | 0 | 0 | 0 | 0 | -1 | -1 | -2 |
| -1 | -1 | 0 | 0 | 0 | 0 | 0 | 0 | 0 | -1 | -1 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -1 | -1 | 0 | 0 | 0 | 0 | 0 | 0 | 0 | -1 | -1 |
| -2 | -1 | -1 | 0 | 0 | 0 | 0 | 0 | -1 | -1 | -2 |
| -2 | -2 | -1 | -1 | 0 | 0 | 0 | -1 | -1 | -2 | -2 |
| -3 | -2 | -2 | -1 | -1 | 0 | -1 | -1 | -2 | -2 | -3 | f=28mm、F=5.6

(B)

| -2 | -2 | -1 | -1 | 0 | 0 | 0 | -1 | -1 | -2 | -2 |
|---|---|---|---|---|---|---|---|---|---|---|
| -2 | -1 | -1 | 0 | 0 | 0 | 0 | 0 | -1 | -1 | -2 |
| -1 | -1 | 0 | 0 | 0 | 0 | 0 | 0 | 0 | -1 | -1 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -1 | -1 | 0 | 0 | 0 | 0 | 0 | 0 | 0 | -1 | -1 |
| -2 | -1 | -1 | 0 | 0 | 0 | 0 | 0 | -1 | -1 | -2 |
| -2 | -2 | -1 | -1 | 0 | 0 | 0 | -1 | -1 | -2 | -2 | f=50mm、F=5.6

(C)

| -2 | -1 | -1 | 0 | 0 | 0 | 0 | 0 | -1 | -1 | -2 |
|---|---|---|---|---|---|---|---|---|---|---|
| -1 | -1 | 0 | 0 | 0 | 0 | 0 | 0 | 0 | -1 | -1 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -1 | -1 | 0 | 0 | 0 | 0 | 0 | 0 | 0 | -1 | -1 |
| -2 | -1 | -1 | 0 | 0 | 0 | 0 | 0 | -1 | -1 | -2 | f=100mm、F=5.6

| -3 | -3 | -2 | -2 | -1 | -1 | -1 | -2 | -2 | -3 | -3 |
|----|----|----|----|----|----|----|----|----|----|----|
| -3 | -2 | -2 | -1 | -1 | -1 | -1 | -1 | -2 | -2 | -3 |
| -2 | -2 | -1 | -1 | 0  | 0  | 0  | -1 | -1 | -2 | -2 |
| -2 | -1 | -1 | 0  | 0  | 0  | 0  | 0  | -1 | -1 | -2 |
| -1 | -1 | 0  | 0  | 0  | 0  | 0  | 0  | 0  | -1 | -1 |
| -1 | -1 | 0  | 0  | 0  | 0  | 0  | 0  | 0  | -1 | -1 |
| -1 | -1 | 0  | 0  | 0  | 0  | 0  | 0  | 0  | -1 | -1 |
| -2 | -1 | -1 | 0  | 0  | 0  | 0  | 0  | -1 | -1 | -2 |
| -2 | -2 | -1 | -1 | 0  | 0  | 0  | -1 | -1 | -2 | -2 |
| -3 | -2 | -2 | -1 | -1 | -1 | -1 | -1 | -2 | -2 | -3 |
| -3 | -3 | -2 | -2 | -1 | -1 | -1 | -2 | -2 | -3 | -3 | f=28mm、F=11

(B)

| -3 | -2 | -2 | -1 | -1 | 0  | -1 | -1 | -2 | -2 | -3 |
|----|----|----|----|----|----|----|----|----|----|----|
| -2 | -2 | -1 | -1 | 0  | 0  | 0  | -1 | -1 | -2 | -2 |
| -2 | -1 | -1 | 0  | 0  | 0  | 0  | 0  | -1 | -1 | -2 |
| -1 | -1 | 0  | 0  | 0  | 0  | 0  | 0  | 0  | -1 | -1 |
| -1 | 0  | 0  | 0  | 0  | 0  | 0  | 0  | 0  | 0  | -1 |
| 0  | 0  | 0  | 0  | 0  | 0  | 0  | 0  | 0  | 0  | 0  |
| -1 | 0  | 0  | 0  | 0  | 0  | 0  | 0  | 0  | 0  | -1 |
| -1 | -1 | 0  | 0  | 0  | 0  | 0  | 0  | 0  | -1 | -1 |
| -2 | -1 | -1 | 0  | 0  | 0  | 0  | 0  | -1 | -1 | -2 |
| -2 | -2 | -1 | -1 | 0  | 0  | 0  | -1 | -1 | -2 | -2 |
| -3 | -2 | -2 | -1 | -1 | 0  | -1 | -1 | -2 | -2 | -3 | f=50mm、F=11

(C)

| -2 | -2 | -1 | -1 | 0  | 0  | 0  | -1 | -1 | -2 | -2 |
|----|----|----|----|----|----|----|----|----|----|----|
| -2 | -1 | -1 | 0  | 0  | 0  | 0  | 0  | -1 | -1 | -2 |
| -1 | -1 | 0  | 0  | 0  | 0  | 0  | 0  | 0  | -1 | -1 |
| -1 | 0  | 0  | 0  | 0  | 0  | 0  | 0  | 0  | 0  | -1 |
| 0  | 0  | 0  | 0  | 0  | 0  | 0  | 0  | 0  | 0  | 0  |
| 0  | 0  | 0  | 0  | 0  | 0  | 0  | 0  | 0  | 0  | 0  |
| 0  | 0  | 0  | 0  | 0  | 0  | 0  | 0  | 0  | 0  | 0  |
| -1 | 0  | 0  | 0  | 0  | 0  | 0  | 0  | 0  | 0  | -1 |
| -1 | -1 | 0  | 0  | 0  | 0  | 0  | 0  | 0  | -1 | -1 |
| -2 | -1 | -1 | 0  | 0  | 0  | 0  | 0  | -1 | -1 | -2 |
| -2 | -2 | -1 | -1 | 0  | 0  | 0  | -1 | -1 | -2 | -2 | f=100mm、F=11

| -6 | -5 | -3 | -2 | 0 | 0 | 0 | -2 | -3 | -5 | -6 |
|---|---|---|---|---|---|---|---|---|---|---|
| -5 | -3 | -2 | 0 | 0 | 0 | 0 | 0 | -2 | -3 | -5 |
| -3 | -2 | 0 | 0 | 0 | 0 | 0 | 0 | 0 | -2 | -3 |
| -2 | 0 | 0 | 0 | 0 | 0 | 0 | 0 | 0 | 0 | -2 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -2 | 0 | 0 | 0 | 0 | 0 | 0 | 0 | 0 | 0 | -2 |
| -3 | -2 | 0 | 0 | 0 | 0 | 0 | 0 | 0 | -2 | -3 |
| -5 | -3 | -2 | 0 | 0 | 0 | 0 | 0 | -2 | -3 | -5 |
| -6 | -5 | -3 | -2 | 0 | 0 | 0 | -2 | -3 | -5 | -6 | f=28mm、F=2

(B)

| -5 | -3 | -2 | 0 | 0 | 0 | 0 | 0 | -2 | -3 | -5 |
|---|---|---|---|---|---|---|---|---|---|---|
| -3 | -2 | 0 | 0 | 0 | 0 | 0 | 0 | 0 | -2 | -3 |
| -2 | 0 | 0 | 0 | 0 | 0 | 0 | 0 | 0 | 0 | -2 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -2 | 0 | 0 | 0 | 0 | 0 | 0 | 0 | 0 | 0 | -2 |
| -3 | -2 | 0 | 0 | 0 | 0 | 0 | 0 | 0 | -2 | -3 |
| -5 | -3 | -2 | 0 | 0 | 0 | 0 | 0 | -2 | -3 | -5 | f=50mm、F=2

(C)

| -3 | -2 | 0 | 0 | 0 | 0 | 0 | 0 | 0 | -2 | -3 |
|---|---|---|---|---|---|---|---|---|---|---|
| -2 | 0 | 0 | 0 | 0 | 0 | 0 | 0 | 0 | 0 | -2 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -2 | 0 | 0 | 0 | 0 | 0 | 0 | 0 | 0 | 0 | -2 |
| -3 | -2 | 0 | 0 | 0 | 0 | 0 | 0 | 0 | -2 | -3 | f=100mm、F=2

| -8 | -6 | -5 | -3 | -2 | 0  | -2 | -3 | -5 | -6 | -8 |
|----|----|----|----|----|----|----|----|----|----|----|
| -6 | -5 | -3 | -2 | 0  | 0  | 0  | -2 | -3 | -5 | -6 |
| -5 | -3 | -2 | 0  | 0  | 0  | 0  | 0  | -2 | -3 | -5 |
| -3 | -2 | 0  | 0  | 0  | 0  | 0  | 0  | 0  | -2 | -3 |
| -2 | 0  | 0  | 0  | 0  | 0  | 0  | 0  | 0  | 0  | -2 |
| 0  | 0  | 0  | 0  | 0  | 0  | 0  | 0  | 0  | 0  | 0  |
| -2 | 0  | 0  | 0  | 0  | 0  | 0  | 0  | 0  | 0  | -2 |
| -3 | -2 | 0  | 0  | 0  | 0  | 0  | 0  | 0  | -2 | -3 |
| -5 | -3 | -2 | 0  | 0  | 0  | 0  | 0  | -2 | -3 | -5 |
| -6 | -5 | -3 | -2 | 0  | 0  | 0  | -2 | -3 | -5 | -6 |
| -8 | -6 | -5 | -3 | -2 | 0  | -2 | -3 | -5 | -6 | -8 | f=28mm, F=5.6

(B)

| -6 | -5 | -3 | -2 | 0  | 0  | 0  | -2 | -3 | -5 | -6 |
|----|----|----|----|----|----|----|----|----|----|----|
| -5 | -3 | -2 | 0  | 0  | 0  | 0  | 0  | -2 | -3 | -5 |
| -3 | -2 | 0  | 0  | 0  | 0  | 0  | 0  | 0  | -2 | -3 |
| -2 | 0  | 0  | 0  | 0  | 0  | 0  | 0  | 0  | 0  | -2 |
| 0  | 0  | 0  | 0  | 0  | 0  | 0  | 0  | 0  | 0  | 0  |
| 0  | 0  | 0  | 0  | 0  | 0  | 0  | 0  | 0  | 0  | 0  |
| 0  | 0  | 0  | 0  | 0  | 0  | 0  | 0  | 0  | 0  | 0  |
| -2 | 0  | 0  | 0  | 0  | 0  | 0  | 0  | 0  | 0  | -2 |
| -3 | -2 | 0  | 0  | 0  | 0  | 0  | 0  | 0  | -2 | -3 |
| -5 | -3 | -2 | 0  | 0  | 0  | 0  | 0  | -2 | -3 | -5 |
| -6 | -5 | -3 | -2 | 0  | 0  | 0  | -2 | -3 | -5 | -6 | f=50mm, F=5.6

(C)

| -5 | -3 | -2 | 0  | 0  | 0  | 0  | 0  | -2 | -3 | -5 |
|----|----|----|----|----|----|----|----|----|----|----|
| -3 | -2 | 0  | 0  | 0  | 0  | 0  | 0  | 0  | -2 | -3 |
| -2 | 0  | 0  | 0  | 0  | 0  | 0  | 0  | 0  | 0  | -2 |
| 0  | 0  | 0  | 0  | 0  | 0  | 0  | 0  | 0  | 0  | 0  |
| 0  | 0  | 0  | 0  | 0  | 0  | 0  | 0  | 0  | 0  | 0  |
| 0  | 0  | 0  | 0  | 0  | 0  | 0  | 0  | 0  | 0  | 0  |
| 0  | 0  | 0  | 0  | 0  | 0  | 0  | 0  | 0  | 0  | 0  |
| 0  | 0  | 0  | 0  | 0  | 0  | 0  | 0  | 0  | 0  | 0  |
| -2 | 0  | 0  | 0  | 0  | 0  | 0  | 0  | 0  | 0  | -2 |
| -3 | -2 | 0  | 0  | 0  | 0  | 0  | 0  | 0  | -2 | -3 |
| -5 | -3 | -2 | 0  | 0  | 0  | 0  | 0  | -2 | -3 | -5 | f=100mm, F=5.6

| -9 | -8 | -6 | -5 | -3 | -3 | -3 | -5 | -6 | -8 | -9 |
|---|---|---|---|---|---|---|---|---|---|---|
| -8 | -6 | -5 | -3 | -2 | -2 | -2 | -3 | -5 | -6 | -8 |
| -6 | -5 | -3 | -2 | 0 | 0 | 0 | -2 | -3 | -5 | -6 |
| -5 | -3 | -2 | 0 | 0 | 0 | 0 | 0 | -2 | -3 | -5 |
| -3 | -2 | 0 | 0 | 0 | 0 | 0 | 0 | 0 | -2 | -3 |
| -3 | -2 | 0 | 0 | 0 | 0 | 0 | 0 | 0 | -2 | -3 |
| -3 | -2 | 0 | 0 | 0 | 0 | 0 | 0 | 0 | -2 | -3 |
| -5 | -3 | -2 | 0 | 0 | 0 | 0 | 0 | -2 | -3 | -5 |
| -6 | -5 | -3 | -2 | 0 | 0 | 0 | -2 | -3 | -5 | -6 |
| -8 | -6 | -5 | -3 | -2 | -2 | -2 | -3 | -5 | -6 | -8 |
| -9 | -8 | -6 | -5 | -3 | -3 | -3 | -5 | -6 | -8 | -9 | f=28mm, F=11

(B)

| -8 | -6 | -5 | -3 | -2 | 0 | -2 | -3 | -5 | -6 | -8 |
|---|---|---|---|---|---|---|---|---|---|---|
| -6 | -5 | -3 | -2 | 0 | 0 | 0 | -2 | -3 | -5 | -6 |
| -5 | -3 | -2 | 0 | 0 | 0 | 0 | 0 | -2 | -3 | -5 |
| -3 | -2 | 0 | 0 | 0 | 0 | 0 | 0 | 0 | -2 | -3 |
| -2 | 0 | 0 | 0 | 0 | 0 | 0 | 0 | 0 | 0 | -2 |
| 0 | 0 | 0 | 0 | 0 | 0 | 0 | 0 | 0 | 0 | 0 |
| -2 | 0 | 0 | 0 | 0 | 0 | 0 | 0 | 0 | 0 | -2 |
| -3 | -2 | 0 | 0 | 0 | 0 | 0 | 0 | 0 | -2 | -3 |
| -5 | -3 | -2 | 0 | 0 | 0 | 0 | 0 | -2 | -3 | -5 |
| -6 | -5 | -3 | -2 | 0 | 0 | 0 | -2 | -3 | -5 | -6 |
| -8 | -6 | -5 | -3 | -2 | 0 | -2 | -3 | -5 | -6 | -8 | f=50mm, F=11

(C)

| -6 | -5 | -3 | -2 | 0 | 0 | 0 | -2 | -3 | -5 | -6 |
|---|---|---|---|---|---|---|---|---|---|---|
| -5 | -3 | -2 | 0 | 0 | 0 | 0 | 0 | -2 | -3 | -5 |
| -3 | -2 | 0 | 0 | 0 | 0 | 0 | 0 | 0 | -2 | -3 |
| -2 | 0 | 0 | 0 | 0 | 0 | 0 | 0 | 0 | 0 | -2 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -2 | 0 | 0 | 0 | 0 | 0 | 0 | 0 | 0 | 0 | -2 |
| -3 | -2 | 0 | 0 | 0 | 0 | 0 | 0 | 0 | -2 | -3 |
| -5 | -3 | -2 | 0 | 0 | 0 | 0 | 0 | -2 | -3 | -5 |
| -6 | -5 | -3 | -2 | 0 | 0 | 0 | -2 | -3 | -5 | -6 | f=100mm, F=11

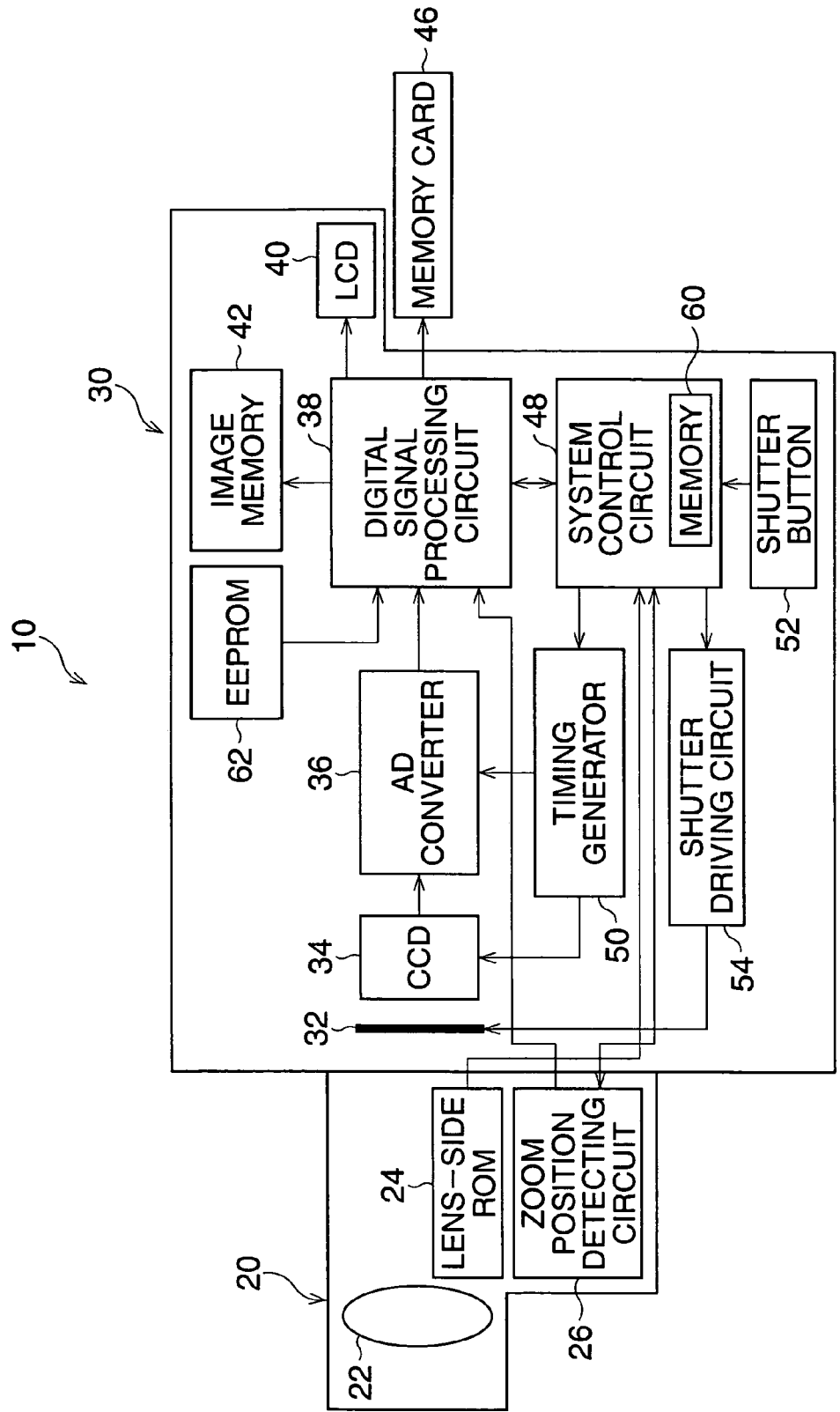

DIGITAL SINGLE-LENS REFLEX CAMERA

BACKGROUND OF THE INVENTION

1. Field of the Invention

The present invention relates to a digital single-lens reflex camera where the lens is exchangeable, especially it relates to a digital single-lens reflex camera which can improve the quality of a photographed image.

2. Description of the Related Art

Recently, the usage of digital single-lens reflex cameras has been gradually expanding, replacing the current silver-halide film single-lens reflex cameras. Generally, in an interchangeable lens for a digital single-lens reflex camera, to identify the photographing lens, identification data and so on are stored. And when the interchangeable lens is attached to the camera body, the identification data and so on are transmitted to the camera body.

Lens exchangeable cameras having data to correct shading and so on for their interchangeable lenses, the data being stored in the interchangeable lens, the camera body, or a storage medium, are known. In these cameras, one of the correction data for correcting shading and so on of the photographing lens under usage is selected based on the identification data of the photographing lens.

When subjects are photographed using a digital camera, required amount of shading correction is not only dependent on the photographing lens, but is also dependent on the imaging device. This is because vignetting generally occurs when light transmitted through a photographing lens reaches an imaging device, and vignetting differs depending on the kind of imaging device, and also on the area of the imaging device. Generally, micro lenses are provided on an imaging device, however, it is difficult to prevent vignetting from occurring by using only the micro lenses. Especially, in the case where the imaging device has many pixels, an vignetting can not be corrected by using only the micro lenses, because the area of the photo diodes is small relative to a distance between micro lenses and the photo diodes. Therefore, shading correction based on only the characteristics of a photographing lens, sometimes can not effectively prevent deterioration of the image quality.

SUMMARY OF THE INVENTION

Therefore, an object of the present invention is to provide a digital single-lens reflex camera which enables images to be corrected based on the combination of an interchangeable lens and an imaging device, and to prevent deterioration of the quality of the images.

A first digital single-lens reflex camera according to the present invention, includes a lens unit and a camera body. The lens unit has a photographing lens and an identification data memory for storing identification data to identify the photographing lens. The camera body to which the lens unit is detachably attached, has an imaging device which receives light transmitted through the photographing lens to generate an image corresponding to a subject, a lens data memory for storing lens data that indicates the shading characteristics of the photographing lens, a lens data reader that reads the lens data based on the identification data, and an image corrector that corrects an error in the image of the subject caused by shading, based on the lens data read by the lens data reader and imaging device data that indicates the shading characteristics of the imaging device.

A first lens unit according to the present invention, includes a photographing lens and an identification data memory for storing identification data to identify the photographing lens. The lens unit is detachably attached to a camera body having an imaging device which receives light transmitted through the photographing lens to generate an image corresponding to a subject, a lens data memory for storing lens data that indicates the shading characteristics of the photographing lens, a lens data reader that reads the lens data based on the identification data, and an image corrector that corrects an error in the image of the subject caused by shading, based on the lens data read by the lens data reader and imaging device data that indicates the shading characteristics of the imaging device.

A first camera body according to the present invention, to which a lens unit having a photographing lens and an identification data memory for storing identification data to identify the photographing lens, is detachably attached, includes an imaging device which receives light transmitted through the photographing lens to generate an image corresponding to a subject, a lens data memory for storing lens data that indicates the shading characteristics of the photographing lens, a lens data reader that reads the lens data based on the identification data, and an image corrector that corrects an error in the image of the subject caused by shading, based on the lens data read by the lens data reader and imaging device data that indicates the shading characteristics of the imaging device.

A second digital single-lens reflex camera according to the present invention, includes a lens unit and a camera body. The lens unit has a photographing lens and a lens data memory for storing lens data that indicates the shading characteristics of the photographing lens. The camera body to which the lens unit is detachably attached, has an imaging device which receives light transmitted through the photographing lens to generate an image corresponding to a subject, a lens data reader that reads the lens data, and an image corrector that corrects an error in the image of the subject caused by shading, based on the lens data read by the lens data reader and imaging device data that indicates the shading characteristics of the imaging device.

A second lens unit according to the present invention, includes a photographing lens and a lens data memory for storing lens data that indicates the shading characteristics of the photographing lens. The lens unit is detachably attached to the camera body having an imaging device which receives light transmitted through the photographing lens to generate an image corresponding to a subject, a lens data reader that reads the lens data, and an image corrector that corrects an error in the image of the subject caused by shading, based on the lens data read by the lens data reader and imaging device data that indicates the shading characteristics of the imaging device.

A second camera body according to the present invention, to which a lens unit having a photographing lens and a lens data memory for storing lens data that indicates the shading characteristics of the photographing lens, is detachably attached, includes an imaging device which receives light transmitted through the photographing lens to generate an image corresponding to a subject, a lens data reader that reads the lens data, and an image corrector that corrects an error in the image of the subject caused by shading, based on the lens data read by the lens data reader and imaging device data that indicates the shading characteristics of the imaging device.

A third digital single-lens reflex camera according to the present invention, includes a lens unit, a storage medium, and a camera body. The lens unit has a photographing lens and an identification data memory for storing identification data to identify the photographing lens. The storage medium is for storing lens data that indicates the shading characteristics of the photographing lens. The camera body to which the lens unit and the storage medium are detachably attached, has an imaging device which receives light transmitted through the photographing lens to generate an image corresponding to a subject, a lens data reader that reads the lens data based on the identification data, and an image corrector that corrects an error in the image of the subject caused by shading, based on the lens data read by the lens data reader and imaging device data that indicates the shading characteristics of the imaging device.

A third camera body according to the present invention, to which a lens unit having a photographing lens and an identification data memory for storing identification data to identify the photographing lens, and a storage medium for storing lens data that indicates the shading characteristics of the photographing lens, are detachably attached, includes an imaging device which receives light transmitted through the photographing lens to generate an image corresponding to a subject, a lens data memory for storing lens data that indicates the shading characteristics of the photographing lens, a lens data reader that reads the lens data based on the identification data, and an image corrector that corrects an error in the image of the subject caused by shading, based on the lens data read by the lens data reader and imaging device data that indicates the shading characteristics of the imaging device.

A third storage medium according to the present invention, is for storing lens data that indicates the shading characteristics of a photographing lens. The third storage medium is detachably attached to a camera body to which a lens unit having the photographing lens and an identification data memory for storing identification data to identify the photographing lens is detachably attached, and the camera body having an imaging device which receives light transmitted through the photographing lens to generate an image corresponding to a subject, a lens data reader that reads the lens data, and an image corrector that corrects an error in the image of the subject caused by shading, based on the lens data read by the lens data reader and imaging device data that indicates the shading characteristics of the imaging device.

BRIEF DESCRIPTION OF THE DRAWINGS

The present invention will be better understood from the description of the preferred embodiments of the invention set forth below together with the accompanying drawings, in which:

FIG. 5 is a view representing an example of the lens data for a first aperture value;

FIG. 6 is a view representing an example of the lens data for a second aperture value;

FIG. 7 is a view representing an example of the lens data for a third aperture value;

FIG. 8 is a view representing an example of the imaging device data for a first aperture value;

FIG. 9 is a view representing an example of the imaging device data for a second aperture value;

FIG. 10 is a view representing an example of the imaging device data for a third aperture value;

FIG. 11 is a view representing an example of the shading data for the first aperture value;

FIG. 12 is a view representing an example of the shading data for the second aperture value;

FIG. 13 is a view representing an example of the shading data for the third aperture value;

FIG. 16 is a block diagram of the digital single-lens reflex camera of the third embodiment.

DESCRIPTION OF THE PREFERRED EMBODIMENTS

Figure 1:
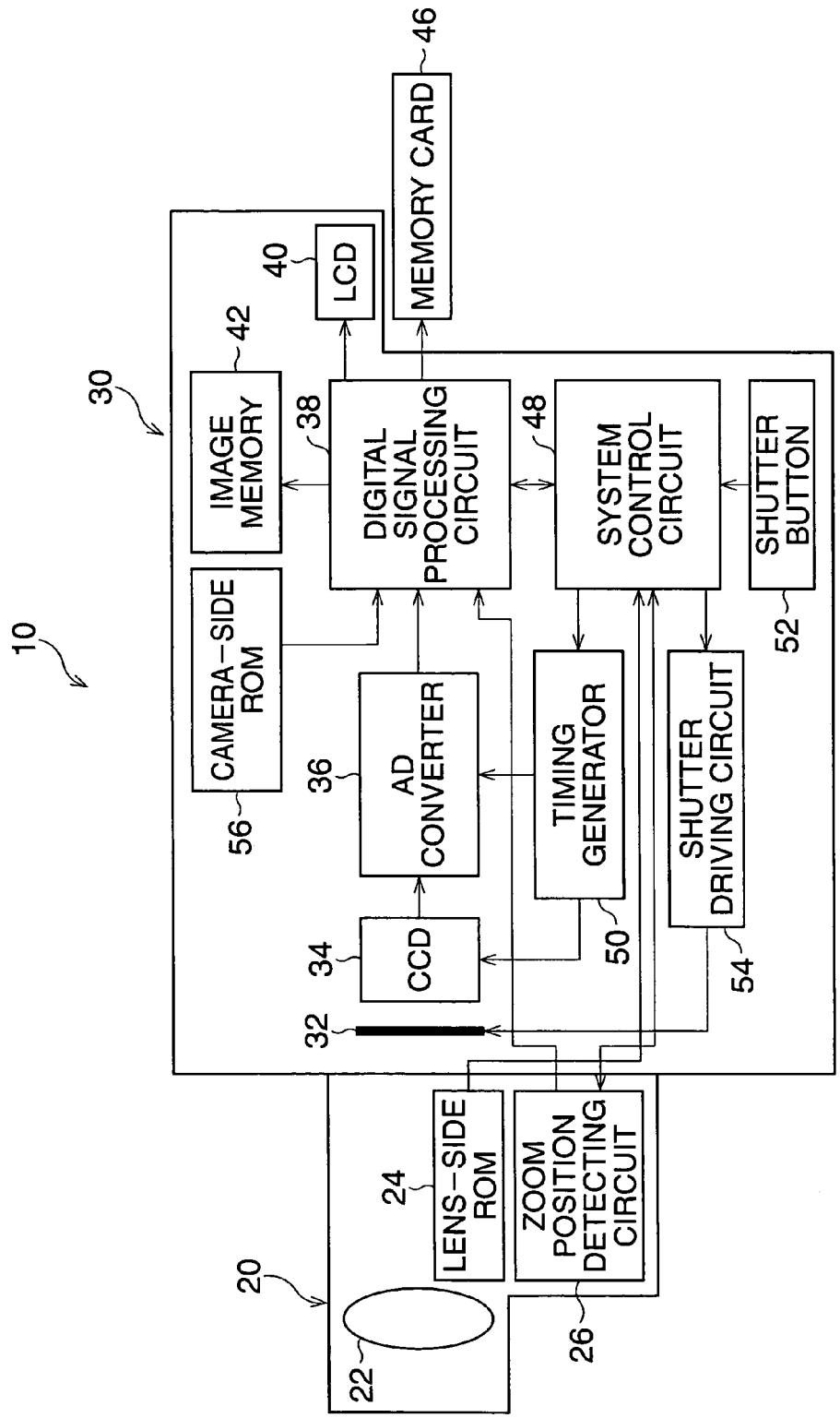
FIG. 1 is a block diagram of the digital single-lens reflex camera of the first embodiment.

Hereinafter, the preferred embodiments of the present invention are described with reference to the attached drawings. FIG. 1 is a block diagram of the digital single-lens reflex camera of the first embodiment.

A digital single-lens reflex camera 10 includes a lens unit 20 having a photographing lens 22 of a zoom lens, and a camera body 30 to which the lens unit 20 is detachably attached. A plurality of lens units including the lens unit 20, can be attached to the camera body 30. The lens unit 20 has a lens-side ROM 24 for storing identification data to identify the photographing lens 22, and a zoom position detecting circuit 26 to detect a zoom position of the photographing lens 22 and transmit zoom position data (focal distance data) indicating the zoom position of the photographing lens 22, to the camera body 30. Further, in the lens unit 20, an aperture position detecting circuit (not shown) to detect an aperture position and transmit aperture position data indicating the aperture position of the aperture, to the camera body 30, is also provided.

In the camera body 30, a CCD 34 which receives light transmitted through the photographing lens 22 and a shutter 32 to generate image signals corresponding to a subject, is provided. When a shutter button 52 on a surface of the camera body 30 is pressed, the photographing lens 22 is driven to a predetermined position by a motor (not shown) under a control of a system control circuit 48, and the aperture is also driven to be in a predetermined opening position. Further, a shutter driving circuit 54 makes the shutter 32 open for a predetermined time based on the control of the system control circuit 48. As a result of this, the CCD 34 whose operation timing is controlled by a timing generator 50 is exposed, and image signals for indicating the subject are generated in the CCD 34.

Image signals generated by the CCD 34 are converted from analog to digital by an A/D converter 36. The digitalized image signals are temporally stored in an image memory 42 after processing by a digital signal processing circuit 38. In a camera-side ROM 56, lens data indicating the shading characteristics of the photographing lenses attachable to the camera body 30 such as the photographing lens 22, and imaging device data indicating the shading characteristics of the CCD 34 are both stored as lookup tables.

When the system control circuit 48 reads the identification data, it is recognized that the used photographing lens is the photographing lens 22, and the system control circuit 48 transmits signals to show that the photographing lens 22 is used, to the digital signal processing circuit 38. The digital signal processing circuit 38 receives the signals and reads the lens data and the imaging device data of the photographing lens 22 from the camera-side ROM 56. Further, the digital signal processing circuit 38 calculates corrected lens data and corrected imaging device data used for correcting the image signals, in accordance with need, based on the zoom position of the photographing lens 22 and the aperture position of the aperture at the photographing time, by interpolation of the lens data and the imaging device data. Image signals are corrected based on these corrected data or based on original data when corrected data are not calculated, and after further processes such as white balance adjustment and gamma correction are conducted, the image signals are stored in the memory card 46. Then an LCD is driven based on the corrected image signals, and a subject image is displayed on the LCD 40.

Figure 2:
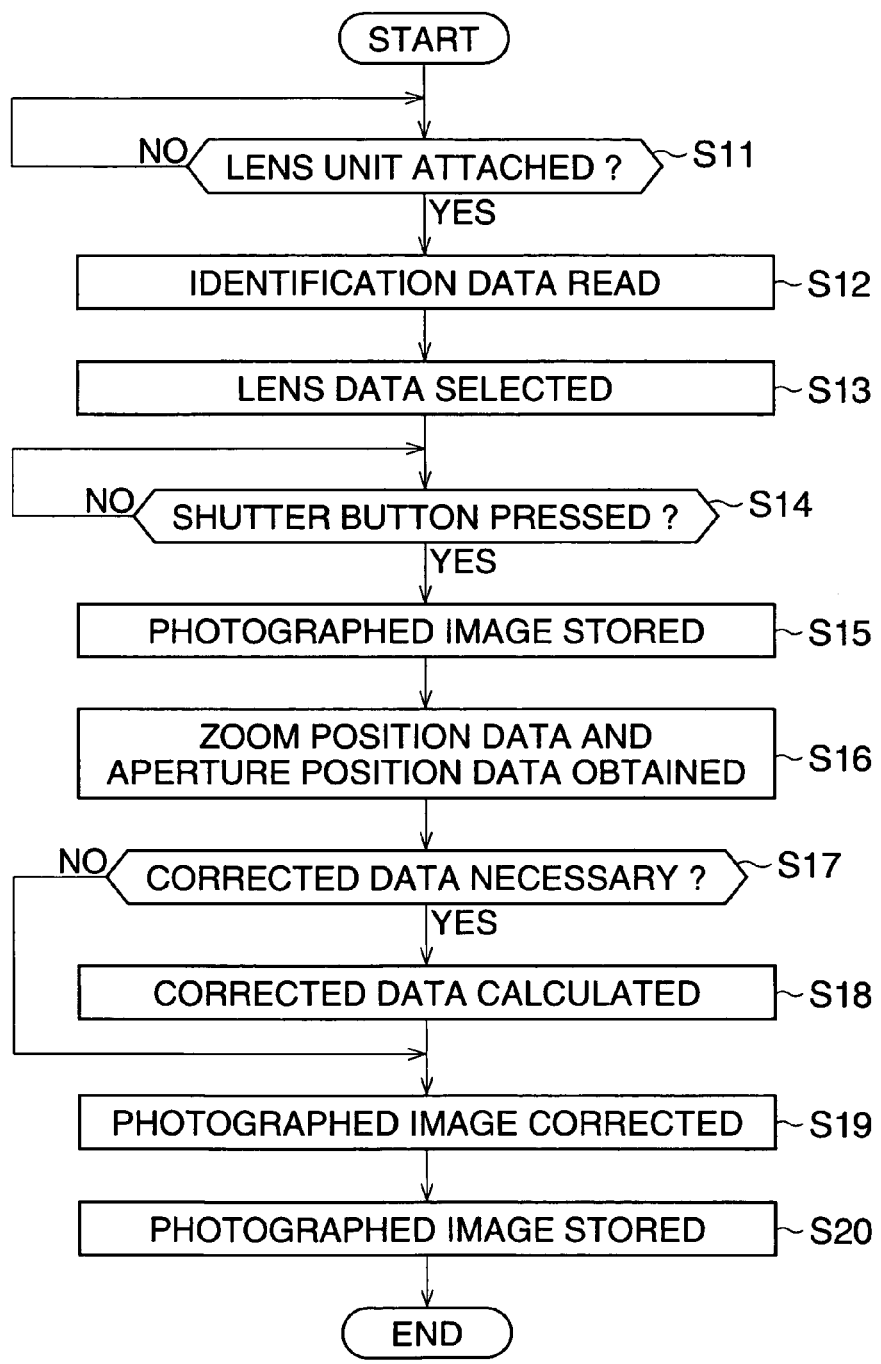
FIG. 2 is a flowchart representing a photographed image correction routine of the first embodiment.

FIG. 2 is a flowchart representing a photographed image correction routine of the first embodiment.

The photographed image correction routine starts when a power switch (not shown) provided on the camera body 30 turns on. At step S11, it is judged whether the lens unit 20 is attached to the camera body 30 or not. When it is judged that the lens unit 20 is attached to the camera body 30, the process proceeds to step S12. At step S12, the identification data of the photographing lens 22 is read by the system control circuit 48, and then the process proceeds to step S13. At step S13, lens data of the photographing lens 22 currently used, is selected among a plurality of lens data stored in the camera-side ROM 56, based on the read identification data. At step S14, it is judged whether the shutter button 52 is pressed or not, and when it is judged that the shutter button 52 is pressed, the process proceeds to step S15.

At step S15, the image signals generated by the CCD 34 due to the photographing action, that is, image signals representing the photographed image are stored in the image memory 42, and the process proceeds to step S16. At step S16, the zoom position data indicating the zoom position of the photographing lens 22, and the aperture position data indicating the aperture position of the aperture are obtained by the digital signal processing circuit 38, and the process proceeds to step S17. At step S17, whether the lens data of the photographing lens 22 selected at step S13, and the imaging device data stored in the camera-side ROM 56, can be used for correcting image or not, that is, whether the calculation of corrected data is necessary or not, is judged. When it is judged that the calculation of corrected data is necessary, the process proceeds to step S18, and when it is judged that the calculation of corrected data is not necessary, the process proceeds to step S19.

At step S18, the corrected data, that is, corrected lens data and corrected imaging device data are calculated by interpolation of the lens data and the imaging device data, both stored as lookup tables, based on the zoom position and the aperture position at the photographing time. At step S19, based on the lens data and imaging device data, or the corrected lens data and corrected imaging device data, image signals are corrected. That is, the photographed image is corrected. At the following step S20, the image signals, after undergoing various processes such as white balance adjustment and gamma correction, are stored in the memory card 46, that is, the corrected photographed image is stored. And then, the photographed image correction routine ends.

Figure 3:
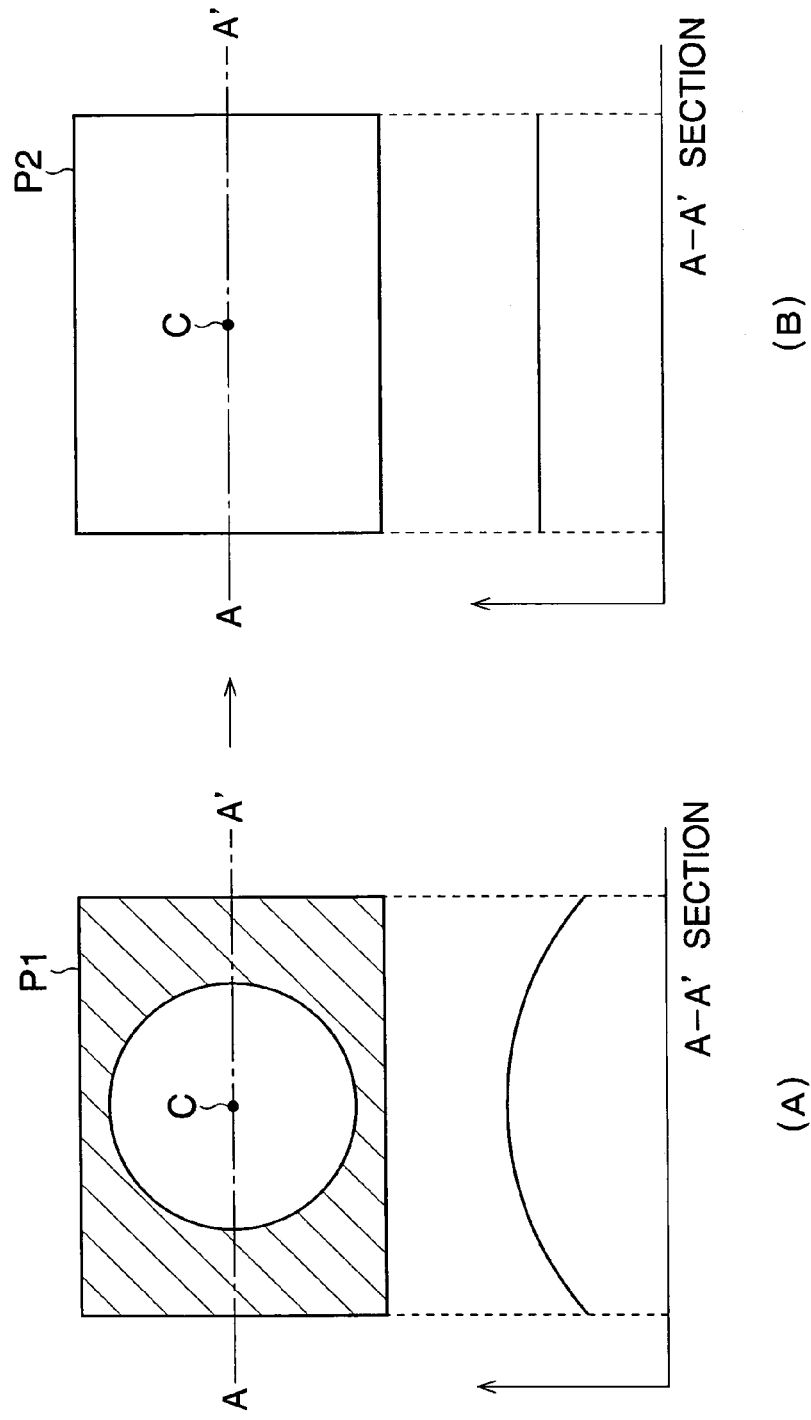
FIG. 3 is a conceptual view representing an image which has deteriorated due to shading, and correction thereof.
Figure 4:
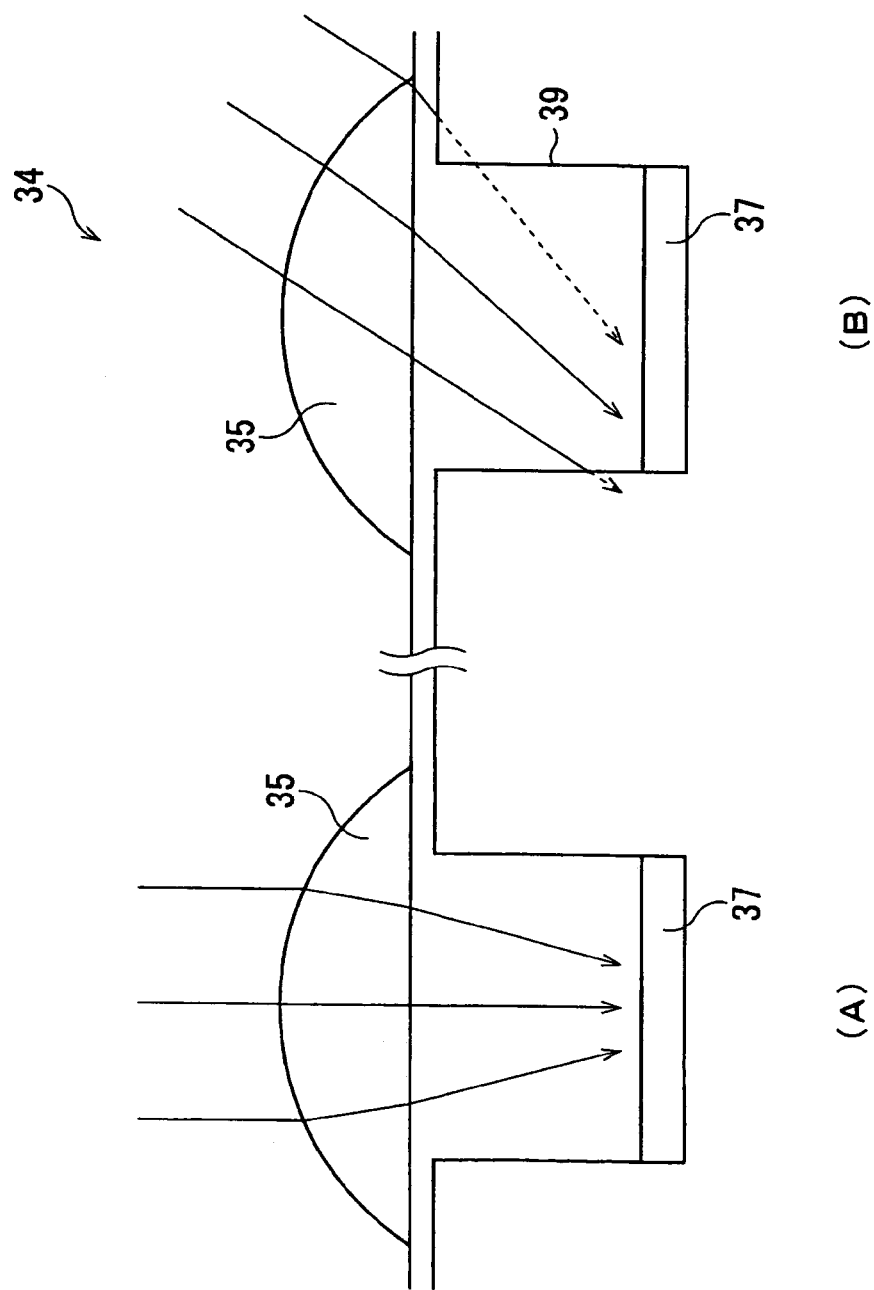
FIG. 4 is a conceptual view representing vignetting in a CCD.

FIG. 3 is a conceptual view representing an image which has deteriorated due to shading, and correction thereof. FIG. 4 is a conceptual view representing afteelipse vignetting occurring due to the CCD 34. Generally, the amount of incident light at the peripheral area of a lens is smaller than that at the center of the lens, further, vignetting occurs due to the lens barrel. Therefore, the peripheral area of a photographed image P1 having a longer distance from the center point C, is darker (see FIG. 3(A)). This shading trend differs from one lens to another, and further, varies by zoom position (focal distance) and aperture value in the same lens. Therefore, a photographed image P2 having constant luminance is formed by correction of the photographed image P1 to raise the luminance at the peripheral area, by using the lens data representing the shading characteristics of the photographing lens 22 for each zoom position (focal distance) and aperture value (see Fig. 3(B)).

Further, shading is caused not only by the photographing lens 22 but also by the CCD 34. Light from a subject approaches pixels located in the center area of the photographing surface of the CCD 34, at an angle of almost perpendicularly to the photographing surface of the CCD 34, transmits a micro lens 35, and enters to a photo diode 37 (see FIG. 4(A)). On the other hand, light from a subject approaches pixels located in the peripheral area of the photographing surface of the CCD 34, at an oblique angle to the photographing surface of the CCD 34. Therefore, a part of light transmitted through the micro lens 35 is shut off by a side wall 39, and an amount of incident light that enters the photo diode 37 is smaller than that at the center area of the photographing surface (see FIG. 4(B)). Because shading is caused not only by the photographing lens 22 but also by the CCD 34, correction for raising luminance in the peripheral area of the image in terms of the CCD 34 is also required, similarly to the correction for shading caused by the photographing lens 22.

FIGS. 5 to 7 represent examples of the lens data, and FIGS. 8 to 10 represent examples of the imaging device data. That is, FIG. 5 is a view representing an example of the lens data for a first aperture value, and FIGS. 6 and 7 are views representing examples of the lens data for second and third aperture values. Similarly to these FIGS. 5 to 7, and FIGS. 8 to 10 are views representing examples of the imaging device data for first to third aperture values.

To form an image having constant luminance by correcting shading, the lens data (see FIGS. 5 to 7) and the imaging device data (see FIGS. 8 to 10) are used. The lens data is unique to a lens, and represents a difference in the amount of light transmitted through the periphery of the photographing lens 22 and a light transmitted through the center of the photographing lens 22. FIGS. 5 to 7 represent examples of the lens data, each value indicates the difference between the amount of light transmitted through that area, and the light transmitted through the center. The unit of each data is a percentage (%).

Here, the outer-most lines of each table of FIGS. 5 to 7, represent the boundaries of the photographing surface of the CCD 34, and each of the lines inside a table divide that surface into partial areas including a predetermined number of pixels. Each value surrounded by the lines, represents an average value of the shading for that partial area. For example, in the corner partial areas in the most peripheral part of the photographing surface of the CCD 34, represented by FIG. 5 (A), shading caused by the photographing lens 22 is 4(%). As can be seen from these FIGS., shading caused by the same lens is larger when the focal distance "f" is smaller, and the aperture value "F" is larger.

On the other hand, the imaging device data which is the same kind of data as the lens data, represents the difference in the amount of light transmitted through lens and entering the periphery of the photographing surface of an imaging device, and the amount of light transmitted through the lens and entering the center of the photographing surface of an imaging device, when it is assumed that no shading is caused by the lens. Shading caused by imaging device is also larger when the focal distance "f" is smaller, and the aperture value "F" is larger (see FIGS. 8 to 10). Note that the unit of the imaging device data is also a percentage (%).

The digital signal processing circuit 38 can calculate corrected lens data which is actually used for correcting shading by interpolation of the lens data, based on the zoom position data and the aperture position data. For example, when the focal distance "f" represented by the zoom position data is 35 (mm), and the aperture value "F" represented by the aperture position data is 2, new lens data, that is corrected lens data, is calculated by the interpolation of the lens data for the focal distance "f" being 28 (mm) and the aperture value "F" being 2 in FIG. 5(A), and the other lens data for the focal distance "f" being 50 (mm) and the aperture value "F" being 2 in FIG. 5(B). In the interpolation, each value of the corrected lens data is calculated to be between the values of corresponding partial areas of the lens data in FIG. 5(A) and FIG. 5(B). Similarly to the corrected lens data, the corrected imaging device data is also calculated in accordance with need. Note that when the lens data and the imaging device data for the focal distance "f" represented by the zoom position data, and the aperture value "F" represented by the aperture position data already exist, interpolations of these data are not necessary, because the lens data and the imaging device data can be used for correcting shadings.

FIGS. 11 to 13 represent examples of shading data calculated from the lens data and the imaging device data. That is, FIGS. 11 to 13 are views representing examples of the shading data for first to third aperture values.

The digital signal processing circuit 38 adds the lens data and the imaging device data, so that the shading data is calculated. (see FIGS. 11 to 13). Here, the shading data "Sd" (%) which is more precise can be calculated by the operation based on the lens data "Sl" and the imaging device data "Sc" as shown by formula (1).

$$Sd=(1-(1-Sl)/100)\times(1-Sc/100)\times100 \quad (1)$$

However, the shading data is calculated by adding the lens data and the imaging device data, because the operation of the formula (1) is complex. And when the corrected lens data and the corrected imaging device data are calculated, the shading data is calculated based on these corrected data. An image having constant luminance is formed by raising the luminance at the peripheral area of the image to be raised, based on the shading data.

In the embodiment mentioned above, the lens data representing the shading characteristics unique to each of interchangeable lens, and the imaging device data representing the shading characteristics unique to the imaging device are previously stored in the camera body 30. The lens data of the used photographing lens selectively read, and the imaging device data are used for correcting image. Thus, shadings of the photographed image can be suitably corrected in accordance with the combination of an interchangeable lens and an imaging device.

Note that in the photographed image correction routine, whether the calculation of corrected data of the lens data and the imaging device data is necessary or not is judged (see step S17 of FIG. 2). However, the shading data can be calculated previously to the judgment, and whether the calculation of corrected shading data is necessary or not can be judged, instead of the judgment process of the lens data and the imaging device data. The lens data and the imaging device data can have different focal distances or different aperture values to each other, differing from the examples of this embodiment where they are the same (see FIG. 5 to 10). In this case, the necessity of calculating the corrected data, is judged for the lens data and the imaging device data respectively.

Figure 14:
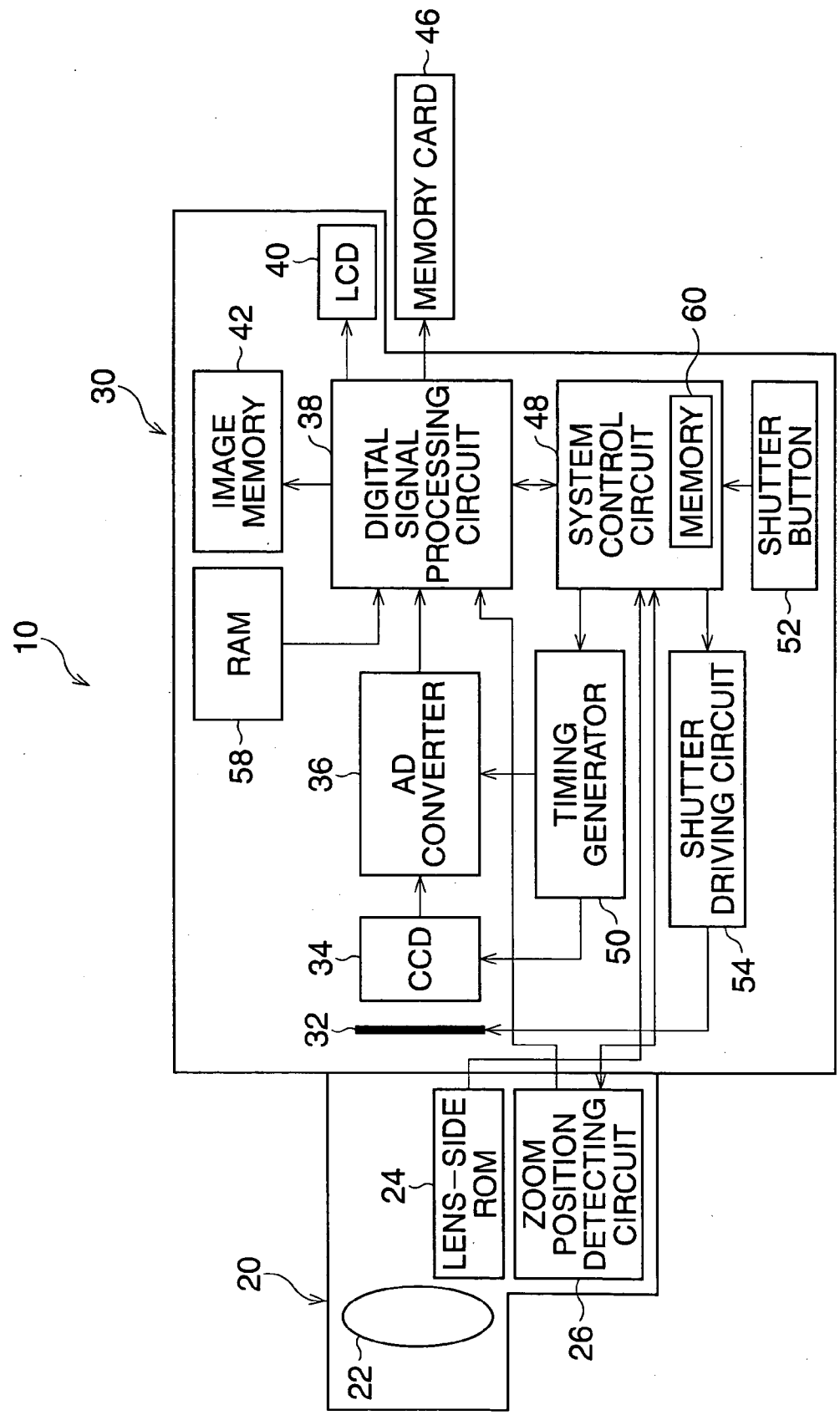
FIG. 14 is a block diagram of the digital single-lens reflex camera of the second embodiment.

FIG. 14 is a block diagram of the digital single-lens reflex camera 10 of the second embodiment.

In this embodiment, there are the following differences from the first embodiment. The lens unit 20 can be attached to and used with a plurality of camera bodies including the camera body 30, and the lens data is stored in the lens unit 20, not in the camera body 30. The lens data is stored in the lens-side ROM 24 with the identification data, and the lens data is stored as full data set. Therefore, when the lens unit 20 is attached to a camera body whose imaging device has the largest format size of the imaging devices included in the camera bodies which can be used with the lens unit 20, such as the camera body 30, the lens data can be used.

The digital signal processing circuit 38 selectively reads a part of, or all of the lens data stored in the lens-side ROM 24 according to the format size of the CCD 34, and stores the read lens data in the RAM 58. Further, the digital signal processing circuit 38 calculates the corrected data in accordance with need, based on the zoom position of the photographing lens 22 and the aperture position of the aperture at the time of photographing, by interpolation of the lens data stored in the RAM 58 and the imaging device data which is read from a memory 60 provided in the system control circuit 48, respectively. And then, the shading data is generated from the corrected lens data and the corrected imaging device data, or the original lens data and the original imaging device data. The shading data is stored in the RAM 58, and is used for shading correction of a photographed image.

In this second embodiment, differing to the first embodiment, the digital signal processing circuit 38 reads only the lens data of the lens unit attached to the camera, body 30, therefore, the identification data to identify the photographing lens is not necessarily required.

Figure 15:
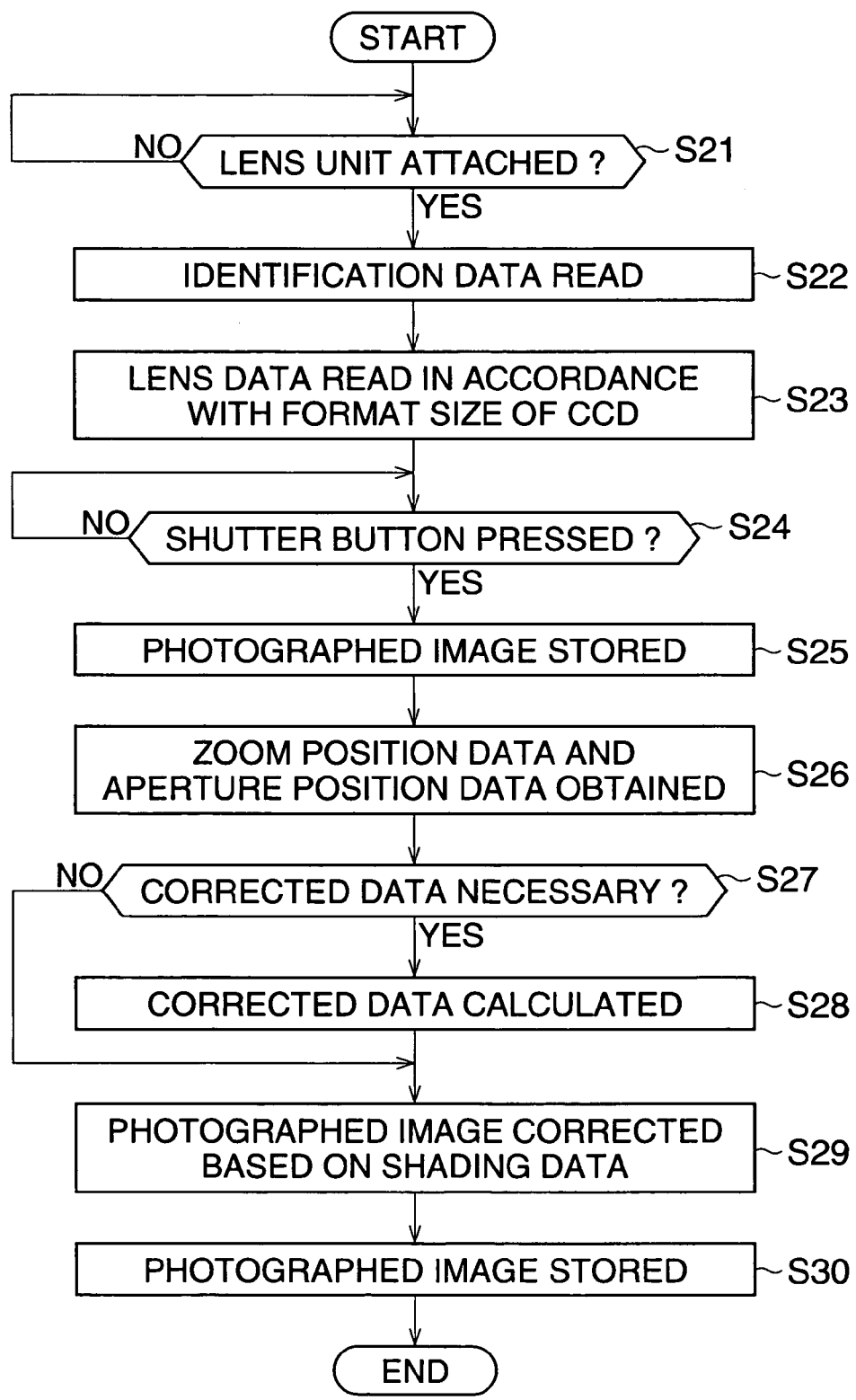
FIG. 15 is a flowchart representing a photographed image correction routine of the second embodiment.

FIG. 15 is a flowchart representing a photographed image correction routine of the second embodiment.

At step S21, it is judged whether the lens unit 20 is attached to the camera body 30 or not. When it is judged that the lens unit 20 is attached to the camera body 30, the process proceeds to step S22. At step S22, the identification data of the photographing lens 22 is read by the system control circuit 48, and then the process proceeds to step S23. At step S23, a part of, or all of the lens data of the full data set stored in the lens-side ROM 24 is read in accordance with the format size of the CCD 34, and the read lens data is stored in the RAM 58. At step S24, it is judged whether the shutter button 52 is pressed or not, and when it is judged that the shutter button 52 is pressed, the process proceeds to step S25.

At step S25, the image signals generated in the CCD 34 by the photographing action, that is, signals representing the photographed image, are stored in the image memory 42, and the process proceeds to step S26. At step S26, the zoom position data indicating the zoom position of the photographing lens 22 and the aperture position data indicating the position of the aperture, are obtained by the digital signal processing circuit 38, and the process proceeds to step S27. At step S27, whether the lens data stored in the RAM 58 at step S23, and the imaging device data stored in the memory 60, can be used for correcting the image as they are or not, that is, whether the calculation of corrected data from the stored lens data or the imaging device data is necessary or not, is judged. When it is judged that the calculation of corrected data is necessary, the process proceeds to step S28, and when it is judged that the calculation of corrected data is not necessary, the process proceeds to step S29.

At step S28, the corrected data, that is, corrected lens data and corrected imaging device data are calculated by interpolation of the lens data and the imaging device data, both of which are stored as lookup tables, based on the zoom position and the aperture position at the time of photographing. At step S29, image signals are corrected based on the shading data calculated from the lens data, imaging device data, or the corrected data. That is, the photographed image is corrected. At the following step S30, the image signals undergone various processes such as white balance adjustment and gamma correction, are stored in the memory card 46, that is, the corrected photographed image is stored. And then, photographed image correction routine ends.

In the embodiment mentioned above, the full lens data set which can be used with an imaging device having the largest format size of the imaging devices which are possible to use, is previously stored in the lens unit 20, the lens data is read in accordance with the format size of the imaging device actually used, and the image is corrected with these data. Therefore, in case the lens unit 20 can be used with a plurality of camera bodies, shadings of the photographed image can be suitably corrected in accordance with the combination of an interchangeable lens and an imaging device.

The first embodiment and the second embodiment can be combined. In this case, in the camera body 30, the lens data of a plurality of photographing lens is stored, the digital signal processing circuit 38 can partially read the full lens data set in accordance with the format size of the imaging device, and the full lens data set is stored in the lens unit 20. As a result of this, in the digital single-lens reflex camera 10 where one of a plurality of lens units and one of a plurality of camera bodies are selected and used as a pair, quality of the photographed image can be improved in accordance with the combination of the lens unit and the camera body.

FIG. 16 is a block diagram of the digital single-lens reflex camera 10 of the third embodiment.

In this embodiment, there are the following differences from the first and second embodiments. The lens data is stored in the memory card 46, and an EEPROM 62 is provided in the camera body 30 instead of the camera-side ROM 56 and RAM 58. The lens data is read by the digital signal processing circuit 38 from the memory card 46, and stored in the EEPROM 62. The digital signal processing circuit 38 selectively reads the lens data of the photographing lens 22 currently used among the lens data stored in the EEPROM 62, based on the identification data of the photographing lens 22. Further, the digital signal processing circuit 38 reads the imaging device data from the memory 60 in the system control circuit 48, and calculates shading data from the lens data of the photographing lens 22 and imaging device data.

In this third embodiment, the EEPROM 62 is not necessarily needed. When the EEPROM 62 is not provided, the digital signal processing circuit 38 selectively reads only lens data for the photographing lens being used, that is, the photographing lens 22, based on the identification data from the memory card 46.

In the embodiment mentioned above, the camera-side ROM and so on, which require a large capacity for storing all the lens data of the photographing lens which may be used, are not necessary by storing only the required lens data, that is the lens data of the photographing lens being actually used such as the photographing lens 22, in the memory card 46. Further, the lens data can be stored in the memory card 46 by down loading, therefore, the required lens data can become easily available to users.

The second embodiment and the third embodiment can be combined. In this case, the digital signal processing circuit 38 can selectively read a part of the full lens data set in accordance with the format size of the imaging device, and the full lens data set is stored in the memory card 46. As a result of this, similarly to combining the first and the second embodiments, in the digital single-lens reflex camera 10 where one of a plurality of lens units and one of a plurality of camera bodies are selected and used as a pair, quality of the photographed image can be improved in accordance with the combination of the lens unit and the camera body.

In any of the embodiments, the photographing lens is not limited to a zoom lens, but, for example, it can be a single focal lens. In this case, only the data representing the predetermined focal distance of the photographing lens 22 is transmitted from the zoom position detecting circuit 26 to the digital signal processing circuit 38.

The imaging device data indicating the shading characteristics of an imaging device can be stored in a storage medium, instead of the camera body 30. And an imaging device is not limited to the CCD 34, for example, a CMOS sensor whose usage has become possible recently, can be used in any of the embodiments.

In any of the embodiments, the corrected data are calculated by interpolation of each of the lens data and the imaging device data, however, the shading data can be calculated before the interpolation, and the corrected data of the shading data can be calculated by interpolation of the shading data.

Finally, it will be understood by those skilled in the art that the foregoing description is of preferred embodiments of the apparatus, and that various changes and modifications may be made to the present invention without departing from the spirit and scope thereof.

The present disclosure relates to subject matters contained in Japanese Patent Application No. 2005-000620 (filed on Jan. 5, 2005) which is expressly incorporated herein, by reference, in its entirety.

The invention claimed is:

1. A digital single-lens reflex camera, comprising:
   a first lens unit having a first photographing lens, a first lens data memory for storing lens data that indicates shading characteristics of said first photographing lens and an identification data memory for storing identification data to identify said first photographing lens; and
   a camera body to which said first lens unit is detachably attached, having an imaging device which receives light transmitted through said first photographing lens to generate an image corresponding to a subject, a second lens data memory for storing lens data that indicates shading characteristics of a second photographing lens of a second lens unit, a lens data reader that reads said lens data that indicates shading characteristics of said first photographing lens from said first lens data memory based on said identification data, and that reads said lens data that indicates shading characteristics of said second photographing lens from said second lens data memory, and an image corrector that corrects an error in said image of said subject caused by shading, based on said lens data read by said lens data reader and imaging device data that indicates shading characteristics of said imaging device,
   wherein said lens data reader can selectively read a part of said lens data that indicates shading characteristics of said first photographing lens from said first lens data memory, according to a format size of said imaging device.

2. The digital single-lens reflex camera according to claim 1,
   wherein said first lens unit further comprises a focal distance data transmitter that transmits focal distance data to said camera body, said focal distance data indicating a focal distance of said first photographing lens, and said camera body further comprises a corrected lens data calculator that calculates corrected lens data from said lens data based on said focal distance data, and said corrected lens data is used for correcting said image.

3. The digital single-lens reflex camera according to claim 2, wherein said first photographing lens is a zoom lens, and said focal distance data indicates a zoom position of said zoom lens.

4. The digital single-lens reflex camera according to claim 2, wherein said lens data is stored as a lookup table, and said corrected lens data calculator calculates said corrected lens data by interpolation of said lens data.

5. The digital single-lens reflex camera according to claim 1, wherein said first lens unit further comprises an aperture for adjusting an amount of light received by said imaging device, and an aperture position data transmitter that transmits aperture position data to said camera body, said aperture position data indicating a position of said aperture, and said camera body further comprises a corrected lens data calculator that calculates corrected lens data from said lens data based on said aperture position data, and said corrected lens data is used for correcting said image.

6. The digital single-lens reflex camera according to claim 5, wherein said lens data is stored as a lookup table, and said corrected lens data calculator calculates said corrected lens data by interpolation of said lens data.

7. The digital single-lens reflex camera according to claim 1, wherein said camera body further comprises an imaging device data memory for storing said imaging device data, and an imaging device data reader that reads said imaging device data.

8. The digital single-lens reflex camera according to claim 7, wherein said first lens unit further comprises a focal distance data transmitter that transmits said focal distance data to said camera body, said focal distance data indicating a focal distance of said first photographing lens, and said camera body further comprises a corrected imaging device data calculator that calculates corrected imaging device data from said imaging device data based on said focal distance data, and said corrected imaging device data is used for correcting said image.

9. The digital single-lens reflex camera according to claim 8, wherein said first photographing lens is a zoom lens, and said focal distance data indicates a zoom position of said zoom lens.

10. The digital single-lens reflex camera according to claim 8, wherein said imaging device data is stored as a lookup table, and said corrected imaging device data calculator calculates said corrected imaging device data by interpolation of said imaging device data.

11. The digital single-lens reflex camera according to claim 7, wherein said first lens unit further comprises an aperture for adjusting an amount of light received by said imaging device, and an aperture position data transmitter that transmits aperture position data to said camera body, said aperture position data indicating a position of said aperture, and said camera body further comprises a corrected imaging device data calculator that calculates corrected imaging device data from said imaging device data based on said aperture position data, and said corrected imaging device data is used for correcting said image.

12. The digital single-lens reflex camera according to claim 11, wherein said imaging device data is stored as a lookup table, and said corrected imaging device data calculator calculates said corrected imaging device data by interpolation of said imaging device data.

13. A first lens unit, comprising:
a first photographing lens;
a first lens data memory for storing lens data that indicates shading characteristics of said first photographing lens, and
an identification data memory for storing identification data to identify said first photographing lens;
wherein said first lens unit is detachably attached to a camera body having an imaging device which receives light transmitted through said first photographing lens to generate an image corresponding to a subject, a second lens data memory for storing lens data that indicates shading characteristics of a second photographing lens of a second lens unit, a lens data reader that reads said lens data that indicates shading characteristics of said first photographing lens from said first lens data memory based on said identification data, and that reads said lens data that indicates shading characteristics of said second photographing lens from said second lens data memory, and an image corrector that corrects an error in said image of said subject caused by shading, based on said lens data read by said lens data reader and imaging device data that indicates shading characteristics of said imaging device,
wherein said lens data reader can selectively read a part of said lens data that indicates shading characteristics of said first photographing lens from said first lens data memory, according to a format size of said imaging device.

14. A camera body to which a first lens unit having a first photographing lens, a first lens data memory for storing lens data that indicates shading characteristics of said first photographing lens and an identification data memory for storing identification data to identify said first photographing lens, is detachably attached, comprising:
an imaging device which receives light transmitted through said first photographing lens to generate an image corresponding to a subject;
a second lens data memory for storing lens data that indicates shading characteristics of a second photographing lens of a second lens unit;
a lens data reader that reads said lens data that indicates shading characteristics of said first photographing lens from said first lens data memory based on said identification data, and that reads said lens data that indicates shading characteristics of said second photographing lens from said second lens data memory; and
an image corrector that corrects an error in said image of said subject caused by shading, based on said lens data read by said lens data reader and imaging device data that indicates shading characteristics of said imaging device,
wherein said lens data reader can selectively read a part of said lens data that indicates shading characteristics of said first photographing lens from said first lens data memory, according to a format size of said imaging device.

15. A digital single-lens reflex camera, comprising:
a lens unit having a photographing lens and a lens data memory for storing lens data that indicates shading characteristics of said photographing lens; and
a camera body to which said lens unit is detachably attached, having an imaging device which receives light transmitted through said photographing lens to generate an image corresponding to a subject, a lens data reader that reads said lens data, and an image corrector that corrects an error in said image of said subject caused by shading, based on said lens data read by said lens data reader and imaging device data that indicates shading characteristics of said imaging device,
wherein said lens data reader can selectively read a part of said lens data according to a format size of said imaging device.

16. The digital single-lens reflex camera according to claim 15,
wherein said lens unit further comprises an identification data memory for storing identification data to identify said photographing lens, and said lens data reader reads said lens data based on said identification data.

17. The digital single-lens reflex camera according to claim 15,
wherein said camera body further comprises an imaging device data memory for storing said imaging device data, and an imaging device data reader that reads said imaging device data.

18. A lens unit comprising:
a photographing lens; and
a lens data memory for storing lens data that indicates shading characteristics of said photographing lens;
wherein said lens unit is detachably attached to a camera body having an imaging device which receives light transmitted through said photographing lens to generate an image corresponding to a subject, a lens data reader that reads said lens data, and an image corrector that corrects an error in said image of said subject caused by shading, based on said lens data read by said lens data reader and imaging device data that indicates shading characteristics of said imaging device,
wherein said lens data reader can selectively read a part of said lens data according to a format size of said imaging device.

19. A camera body to which a lens unit having a photographing lens and a lens data memory for storing lens data that indicates shading characteristics of said photographing lens, is detachably attached, comprising:
an imaging device which receives light transmitted through said photographing lens to generate an image corresponding to a subject;
a lens data reader that reads said lens data; and an image corrector that corrects an error in said image of said subject caused by shading, based on said lens data read by said lens data reader and imaging device data that indicates shading characteristics of said imaging device,
wherein said lens data reader can selectively read a part of said lens data according to a format size of said imaging device.

20. A storage medium for storing lens data that indicates shading characteristics of a photographing lens, wherein said storage medium is detachably attached to a camera body to which a lens unit having said photographing lens and an identification data memory for storing identification data to identify said photographing lens is detachably attached, and said camera body having an imaging device which receives light transmitted through said photographing lens to generate an image corresponding to a subject, a lens data reader that reads said lens data, and an image corrector that corrects an error in said image of said subject caused by shading, based on said lens data read by said lens data reader and imaging device data that indicates shading characteristics of said imaging device,
wherein said lens data reader can selectively read a part of said lens data according to a format size of said imaging device.

* * * * *